Aug. 26, 1930.                W. F. BUTLER                1,773,946
                              FILLING MACHINE
              Original Filed Dec. 31, 1924      2 Sheets-Sheet 1
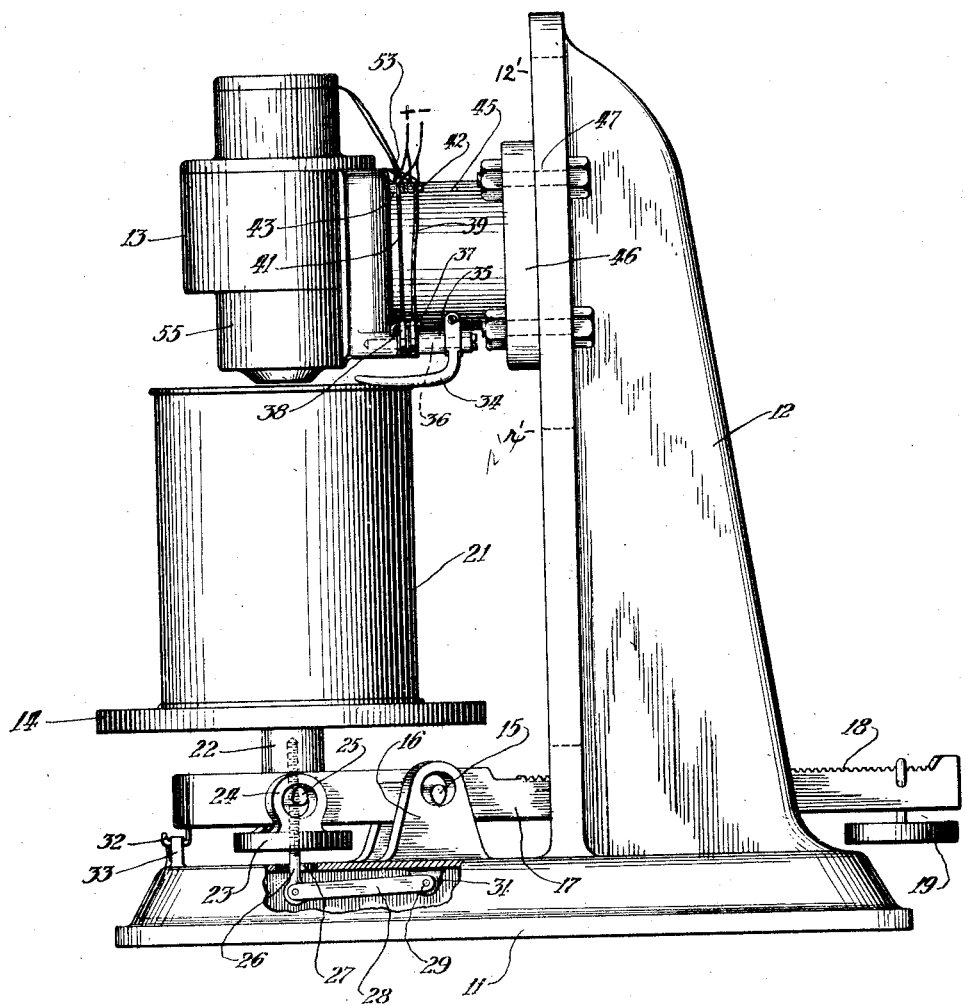

Aug. 26, 1930. W. F. BUTLER 1,773,946
FILLING MACHINE
Original Filed Dec. 31, 1924 2 Sheets-Sheet 2
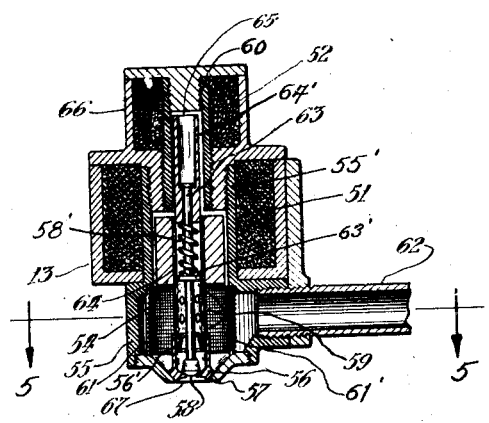
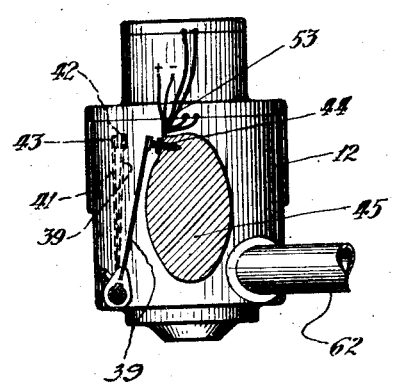
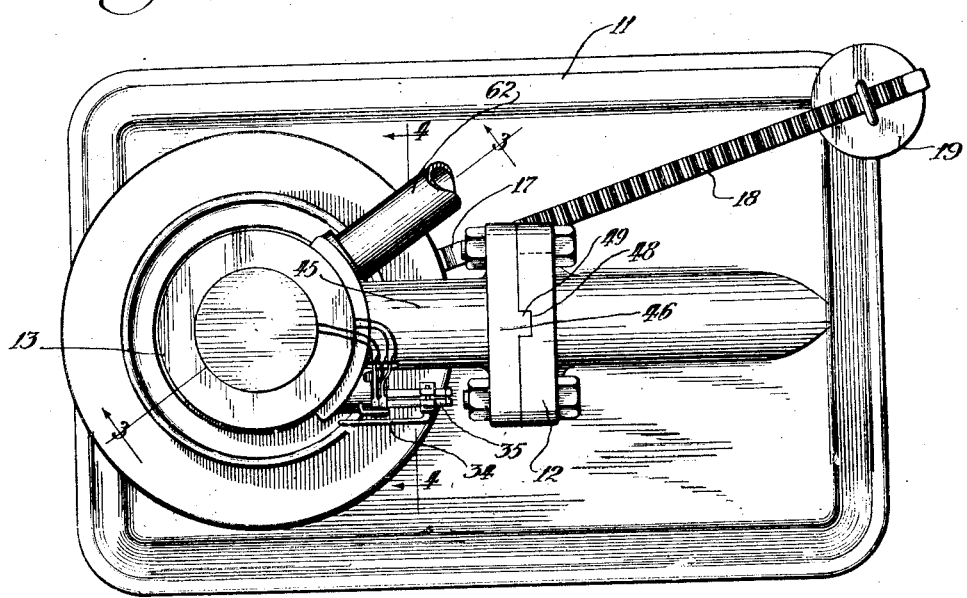
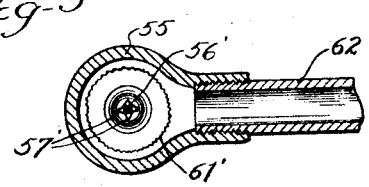
INVENTOR.
William F. Butler,
BY Munday Clarke &
Carpenter
ATTORNEYS Patented Aug. 26, 1930

1,773,946

UNITED STATES PATENT OFFICE

WILLIAM F. BUTLER, OF HILLSIDE, NEW JERSEY, ASSIGNOR TO AMERICAN CAN COMPANY, OF NEW YORK, N. Y., A CORPORATION OF NEW JERSEY

FILLING MACHINE

Application filed December 31, 1924, Serial No. 759,187. Renewed July 11, 1926.

This invention relates to filling machines and its purpose is to provide a machine for filling paint cans, or other receptacles, by means of automatic mechanism adapted to cut off the flow of material into the container after a predetermined weight, or volume, has been placed therein.

The embodiment of the invention which I have shown upon the drawings is particularly adapted for filling cans with paint or like liquid material, though I desire to have it understood that the invention is not limited to this use, but may be embodied in machines for filling cans or other containers with various kinds of products which may or may not be of liquid form.

A highly important feature of the invention is the use of an electrical control for the filling mechanism adapted to quickly and accurately cut off the flow of material after a predetermined quantity has been admitted to the container and from this aspect of the invention, the devices for actuating the electrical control to make and break the contacts may be considered as of any type suitable for the purpose, the particular mechanical elements and means of operation being unimportant.

Another object of the invention is the provision of an electrical control for a filling machine in conjunction with a weighing mechanism, preferably a platform scales for supporting the can to be filled, whereby the movement of the platform and container positioned thereon under the weight of the material entering the container is utilized to control the electrical connections so that the weight of the container determines the time of cutting off the flow of the material.

A further object of the invention is the provision, in a filling machine, of a double or plural valve mechanism adapted to first cut down the flow of material to a relatively small stream and thereafter, through the closing of another valve, finally cutting off the flow with exactness and rapidity, which would be impossible with a single valve, the valves for this purpose being preferably arranged one within the other and the flow of the material assisting to seat the outer or main valve.

In filling and weighing containers in large quantities, it is very essential that the cutting off and stopping of the flow of material into the container be accomplished with great exactness and rapidity. In such filling, the paint or other material is ordinarily conveyed by pipes from large vats which are placed above the filling outlet, or valve, and which, by reason of their position and construction, result in a considerable hydrostatic head, with its attendant pressure. This results in a very rapid filling and it is obvious that, under such conditions, the valve member must act very rapidly after the desired quantity of material has entered the container. To this end, I have provided for exceptionally quick operation of the valve or valves and in the event that a plurality of valves are employed, the construction is such that said valves are closed successively so that as the container approaches the desired weight, the main flow is cut off and later after the exact desired weight is attained, the filling outlet is completely closed, with a high degree of precision and accuracy, this arrangement contributing also to cleanliness in operation of the machine.

Numerous other objects and advantages of the invention will be apparent as it is better understood from the following description, which, taken in connection with the accompanying drawings, discloses a preferred embodiment thereof.

Referring to the drawings,

Figure 1 is a side elevation, partially broken away, of a filling machine in which my invention is embodied;

Fig. 2 is a top plan view thereof;

Figs. 3 and 4 are sectional views, taken upon Fig. 2, substantially along the section lines 3—3 and 4—4, respectively; and Fig. 5 is a sectional plan view taken along the line 5—5 of Fig. 3.

Upon said drawings, I have shown, for illustrative purposes only, a preferred form of my invention, in which the reference character 11 indicates a base from which arises an upright 12, supporting a filling head 13 above a platform 14 of a scale mechanism which is supported by means of a knife-edge pin 15 in upstanding ears or brackets 16 upon said base 11. Said knife-edge pin 15 extends transversely through a beam 17, which is serrated at the top, as indicated at 18, and adapted to carry a weight 19, which may be adjusted to any desired position thereon to balance the weight of a container 21, supported upon the platform 14, when said container is filled with the desired volume of paint, or other material, as will be presently more fully described. The platform 14 is rigidly secured to a neck-piece 22, which extends through a slot in the end of the beam 17 at the left of the knife-edge support 15, said neck-piece being rigid with a plate 23 having thereon a pair of integral apertured brackets 24, extending upwardly at opposite sides of the beam. Knife-edge pins 25 extend outwardly from the beam at opposite sides thereof and into the apertures of said brackets and a threaded pin 26 extends downwardly from said neck piece through an aperture 27 in the base and is pivotally connected with an arm 28 pivoted at 29 to a lug 31 depending from the under side of said base. The beam 17 and said arm 28 are thus held in parallelism and the platform 14 is carried upon the beam in such manner as to present a level surface at all times, regardless of the normal variations in the angle of said scale beam. A hook 32 upon the end of said beam, at the left in Fig. 1, cooperates with an eye 33 extending upwardly from the base to limit the pivotal movement of the beam upon the knife-edge 15, in manner which will be readily understood.

The containers to be filled are placed upon the platform 14 by hand, or by any suitable feeding mechanism, and are adapted to engage an arm 34 carried upon a rock sleeve 35, mounted upon a fixed stud 36 projecting from the filling head 13. Said sleeve carries arms 37 and 38, which carry, respectively, spring blades 39 and 41 provided at their upper ends with contact members 42 and 43 adapted to engage terminals 44 upon a bracket 45, which supports the filling head and is projected from a plate 46, which is adjustably secured by bolts 47 to the upright 12, said upright being provided with a featherway 48 and said plate having a tongue 49 disposed in said featherway, whereby the filling head may be vertically adjusted with respect to the platform 14, in accordance with the height of the cans to be filled. One of said parts, say the upright 12, is provided with a slot or slots 12' through which said bolts pass.

Referring now to Figs. 3 and 4, it will be observed that I provide in the filling head 13 two solenoids, indicated, respectively, by the reference characters 51 and 52, which are connected by suitable wiring 53 with the terminals 44, so that when contact is made with said terminals by the contacts 42 and 43, said solenoids are energized for the purpose of controlling the outlet valves, as will now be described. A main valve member, consisting of a core 54, a perforated tube 64 and a beveled part 56, is movably mounted within the lower part 55 of the filling head and is adapted to be acted upon by the main solenoid 51 to lift the lower beveled part 56 out of contact with a valve seat 57 in the bottom of the filling head when said solenoid is energized by completing the electric circuit in which said solenoid is included, in the manner hereinbefore described. The lower beveled portion 56 of said valve 54 has a small opening 58 in the center thereof and perforations 59 in said tube 64 communicate with a chamber 61, which is communicably connected by means of a pipe 62 with a source of the material to be packed, which may be a vat, or any suitable container, and is arranged to provide a suitable pressure to cause the material to flow through the filling head when the valve is open. The opening 58 is normally closed by means of a valve rod 63, which is disposed within the perforated tube 64 in the main valve member and extends upwardly through a core 64' positioned in the bore 65 in an upper portion 66 of the filling head, in which is also disposed around the bore 65 the second solenoid 52, which is adapted to be energized by means of the contact 42 and its associated terminal 44.

The main valve member and the second or auxiliary valve member are spaced relative to each other through the medium of a spring 58'. This spring is positioned about the valve rod 63 between the lower end of the core 64' of the second solenoid 52 and a collar 63' fixed to the valve stem 63. This clearly keeps the opening 58 closed. The movement of the main valve member is in excess of the movement of the second valve member and when the latter is lifted to raised position, it is open only when the main valve member is in its lower or closed position. When the main valve member is in its upward or open position, the fact that its movement is greater than the movement of the second valve member causes the smaller valve to remain closed and the spring 48' to be held under tension. The particular result of this is that the small valve is only opened to unseat the opening 58 when the main valve member is closed to seat its opening 67.

Material flowing through the pipe 62 passes through a circular screen 61' and if the main valve is in open position, passes through the opening 67 about the beveled part 56 of the main valve member. A portion of the material also passes through the perforations 59 of the tube 64 and through a collar member 56' which surrounds the valve stem 63, the said collar having notches 57' to permit communication between the inside of the perforated tube 64 and the lower part of the second or auxiliary valve. These notches 57' are for the purpose of breaking up the flow of the material through the opening 58, thus preventing the liquid from falling into the container being filled with such force or velocity as to influence the depression of the platform 14 of the scale mechanism. This construction tends to provide a restricted flow of material and thus tends to increase the accuracy of the scales.

The screen 61', arranged in the valve chamber 61, prevents any solid substance contained in the liquid passing into the chamber from passing into the container, as this might tend to clog the valve mechanisms.

For the efficient operation of the valves, it is desirable that different materials be used for different parts, in accordance with the magnetic property desired in said parts. For this reason, the outer wall of the filling head 13, which comprises the valve casing, is preferably made of steel, or other material having substantially the same magnetic property. The parts surrounding the core members 54 and 64' are preferably made of brass, or like material, in order to prevent lateral attraction of the core members which would interfere with the lifting thereof by the solenoids. These brass parts, as shown, comprise the lower part of the filling head, or valve chamber 55, with an upwardly extended tubular part 55' thereof and a tube 60 surrounding the core 64' and disposed adjacent the smaller solenoid 52.

When a can to be filled is positioned upon the platform 14, the arm 34 is rotated to establish the contacts 42, 44 and 43, 44, thus energizing the solenoids 51 and 52, lifting both the valves 54 and 63. The material is thus admitted through the main valve opening 67 into the container and as the weight increases, said container tends to overbalance the weight 19 upon the opposite end of the scale beam from the platform 14 and as it moves downwardly, the arm 34 moves correspondingly, so that at a predetermined weight of the can, the contact 43 is moved away from its associated contact 44, de-energizing the solenoid 51 and permitting the valve 54 to descend to close the opening 67.

It will be observed that the contact 42 is arranged in advance of the contact 43, so that the latter contact is first disengaged, permitting the valve 54 to close prior to the closing of the valve 63 and the flow of the material through the passages 59 and opening 58 assist in the seating of said main valve. Thereafter, as the container continues on its downward movement, the solenoid 52 is de-energized by the moving of the contact 42 out of engagement with its associated terminal 44 and the valve 63 is permitted to descend by gravity, assisted by the flow of material, to close said opening 58 and thus completely cut off the flow of material into the container.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. A filling machine, comprising scale mechanism including a support for a container to be filled, filling mechanism including a head and valve, electrical means including a core connected with the valve, a coil to operate said core and contacts for controlling said coil, and means on the head of said filling mechanism operable by movement of the container as it is put in filling position and then by the weight of the material filled thereinto, for making and breaking said electrical contacts to open said valve when a container is placed on said support and to close it when material of predetermined weight has been fed into the container.

2. A filling machine, comprising scale mechanism including a support for a container to be filled, filling mechanism including a valve, electrical means including a core connected with the valve, a coil to operate said core and contacts for controlling said coil, and means on the head of the filling mechanism and operable by the container as it is put in filling position and then upon movement of the scale support under the weight of the material fed into the container, for making and breaking said electrical contacts to open said valve when a container is placed on said support and to close it when material of predetermined weight has been fed into the container.

3. A filling machine, comprising scale mechanism including a support for a container to be filled, a filling head and mechanism, means whereby said filling mechanism is adapted for vertical adjustment above the container position and including a valve, electrical means including a core connected with the valve, a coil to operate said core and contacts for controlling said coil, and means on said filling head operable by movement of the container and then by the weight of the material filled thereinto, for making and breaking said electrical contacts to open said valve when a container is placed on said support and to close it when material of predetermined weight has been fed into the container.

4. A filling machine, comprising scale mechanism including a support for a container to be filled, filling mechanism including a plurality of successively operable concentric valves operating at substantially the same point of delivery for controlling the feeding of material into the container, and electrical means for opening and closing said valves in accordance with the position of the container with respect to said filling mechanism.

5. A filling machine, comprising scale mechanism including a support for a container to be filled, filling mechanism including a plurality of successively operable valves for controlling the feeding of material into the container, and electrical means for opening and closing said valves in accordance with the position of the container with respect to said filling mechanism and said valves being arranged one within the other and the outer valve being provided with openings through which the material may pass after said outer valve is closed.

6. A filling machine, comprising scale mechanism including a support for a container to be filled, filling mechanism including a plurality of successively operable valves for controlling the feeding of material into the container, and electrical means for opening and closing said valves in accordance with the position of the container with respect to said filling mechanism and said valves being arranged one within the other and the outer valve being provided with openings through which the material may pass after said outer valve is closed and the latter being seated partially through the passage of the material therethrough.

7. A filling machine, comprising scale mechanism including a support for a container to be filled, a filling head having a valve therein, a stem on said valve, a magnetic core connected with said stem, a solenoid for controlling said core, means on said head and engageable by the container for energizing said solenoid to open the valve when a container is positioned for filling, and means for de-energizing the solenoid when the material fed into the container reaches a predetermined weight.

8. A filling machine, comprising scale mechanism including a support for a container to be filled, a filling head, a plurality of valves in said filling head, a separate solenoid arranged to control each of said valves, means for energizing said solenoids to open the valves when a container is positioned for filling, and means for de-energizing the solenoids when the material fed into the container reaches a predetermined weight.

9. A filling machine, comprising scale mechanism including a support for a container to be filled, a filling head, a plurality of valves in said filling head, a separate solenoid arranged to control each of said valves, means for energizing said solenoids to open the valves when a container is positioned for filling, and means for successively de-energizing said solenoids so that first one and then the other of said valves is closed to accurately cut off the passage of material into the container.

10. A filling machine, comprising scale mechanism including a support for a container to be filled, a filling head, a plurality of valves in said filling head, a separate solenoid arranged to control each of said valves, means for energizing said solenoids to open the valves when a container is positioned for filling, and means for successively de-energizing said solenoids so that first one and then the other of said valves is closed to accurately cut off the passage of material into the container, the last closed of said valves controlling a relatively small opening so that as the container becomes nearly filled, the stream of material becomes relatively small and may be quickly and accurately checked.

11. A filling machine, comprising scale mechanism including a support for a container to be filled, a filling head, a plurality of valves in said filling head, a separate solenoid arranged to control each of said valves, means for energizing said solenoids to open the valves when a container is positioned for filling, and means for successively de-energizing said solenoids so that first one and then the other of said valves is closed to accurately cut off the passage of material into the container, the last closed of said valves controlling a relatively small opening in the first-closed valve, the material passing through said opening assisting in seating said first-closed valve and the stream of material into the container being greatly reduced and adapted to be quickly and accurately checked after said valve is closed.

12. A filling machine, comprising a scale mechanism including a support for a container to be filled, a filling head having a valve therein communicating with a supply of material to be packed, electro-magnetic means for opening said valve, and means on said filling head operable by a container placed upon said scale support for energizing said electro-magnetic means to open the valve, said means being movable in accordance with the change of position of said container with respect to said filling head to de-energize said electro-magnetic means and thereby permit closing of the valve after material of predetermined weight has been fed into the container, said valve having a magnetic core and said control having a coil enclosing said core.

13. A filling machine, comprising a scale mechanism including a support for a container to be filled, a filling head having a valve therein communicating with a supply of material to be packed, electro-magnetic means for opening said valve, and means operable by a container placed upon said scale support for energizing said electro-magnetic means to open the valve, said means including an arm adapted to contact with the container, a rocking member associated with said arm and an electric contact carried by said rocking member, said arm being movable in accordance with the change of position of said container to move said contact and thereby de-energize said electro-magnetic means to permit gravity closing of said valve after material of predetermined weight has been placed in the container.

14. A filling machine, comprising a scale mechanism including a support for a container to be filled, a filling head having a plurality of valves arranged one within the other therein and communicating with a source of material to be packed, separate electro-magnetic means for opening each of said valves, an arm operable by contact with a container placed upon said scale support, a plurality of contacts associated with said arm and movable thereby to establish electrical connections with said electro-magnetic means to open the valves when a container is positioned for filling, said contacts being arranged one in advance of the other and said arm being movable in accordance with the change of position of the container as the scale mechanism moves downwardly under the weight of the material to successively break the contacts and cause said valves to successively close to first cut off the main stream of the material into the container and then cut off a smaller stream, thereby controlling the filling so that only an exact predetermined quantity of material is fed into each container.

15. A filling machine, comprising platform scales, a filling head, means whereby said filling head is adapted for vertical adjustment above the platform of said scales in accordance with the height of the containers to be filled, a valve in said head communicating with a source of material to be packed, and an electrical control for said valve adapted to cut off the flow of material when material of predetermined weight has been placed upon a platform of said scales, said valve having a magnetic core and said control having a coil enclosing said core, said electrical control having a part mounted on the filling head and engageable by the container to establish the electric circuit.

16. A filling machine, comprising a container support, a filling head having a valve therein communicating with a source of material to be packed, and an automatic electric control for closing said valve after a predetermined quantity of material has been fed into the container, said valve having a magnetic core and said control having a coil enclosing said core, said electrical control having a part mounted on the filling head and movable by the container to establish the electric circuit.

WILLIAM F. BUTLER.